(12) United States Patent
Laroche

(10) Patent No.: US 6,453,252 B1
(45) Date of Patent: Sep. 17, 2002

(54) PROCESS FOR IDENTIFYING AUDIO CONTENT

(75) Inventor: Jean Laroche, Santa Cruz, CA (US)

(73) Assignee: Creative Technology Ltd., Singapore (SG)

( * ) Notice: Subject to any disclaimer, the term of this patent is extended or adjusted under 35 U.S.C. 154(b) by 0 days.

(21) Appl. No.: 09/570,679

(22) Filed: May 15, 2000

(51) Int. Cl.[7] ............................................... G06F 17/00
(52) U.S. Cl. ............................................ 702/75; 702/73
(58) Field of Search .............................. 702/57, 71, 73, 702/75; 73/432.1; 116/1; 324/76.12, 76.19; 381/124; 386/75, 96

(56) References Cited

U.S. PATENT DOCUMENTS

| | | | |
|---|---|---|---|
| 3,919,479 A | 11/1975 | Moon et al. ............... 179/1 SB |
| 4,230,990 A | 10/1980 | Lert, Jr. et al. ................ 455/67 |
| 5,581,658 A | * 12/1996 | O'Hagan et al. ............. 395/22 |
| 5,619,616 A | * 4/1997 | Brady et al. .................... 395/22 |
| 6,266,003 B1 | * 7/2001 | Hock .......................... 341/155 |

OTHER PUBLICATIONS

Pfeiffer, S. et al., "Automatic Audio Content Analysis" ACM Multimedia 96, ACM Multimedia, Boston, MA ACM 0–89791–871–1/96/11.

* cited by examiner

Primary Examiner—John S. Hilten
Assistant Examiner—Douglas N Washburn
(74) Attorney, Agent, or Firm—Townsend and Townsend and Crew LLP

(57) ABSTRACT

A fingerprint of an audio signal is generated based on the energy content in frequency subbands. Processing techniques assure a robust identification fingerprint that will be useful for signals altered subsequent to the generation of the fingerprint. The fingerprint is compared to a database to identify the audio signal.

10 Claims, 1 Drawing Sheet

PROCESS FOR IDENTIFYING AUDIO CONTENT

BACKGROUND OF THE INVENTION

The present invention relates to techniques for automatically identifying musical pieces by monitoring the content of an audio signal.

Several techniques have been devised in the past to achieve this goal. Many of the techniques rely on side information extracted, for example, from side-band modulation (in FM broadcast) or depend on inaudible signals (watermarks) having been inserted in the material being played.

A few patents describe techniques that seek to solve the problem by identifying songs without any side information by extracting "fingerprints" from the song itself, see e.g.:

Patent (U.S. Pat. No. 4,230,990) which describes a system that relies on a frequency domain analysis of the signal, but also requires the presence of a predetermined "signaling event" such as a short single-frequency tone, in the audio or video signal.

Patent (U.S. Pat. No. 3,919,479) which describes a system designed to identify commercials in TV broadcasts. The system extract a low-frequency envelope signal and correlates it with signals in a database.

However, the systems described in these patents suffer significant drawbacks:

The fingerprint matching technique is usually based on a cross-correlation, which is typically a costly process and is impractical when large databases of fingerprints are to be used.

The fingerprint which is extracted from the signal is not very robust to signal alterations such as coding artifacts, distortion, spectral coloration, reverberation and other effects that might have been added to the material.

Accordingly, simple identifications techniques that are robust to signal alterations are required.

SUMMARY OF THE INVENTION

According to one aspect of the invention, musical pieces (e.g., a given song by a given artist) can be automatically identified by monitoring the content of the audio signal. A typical example is a device that continuously listens to a radio broadcast, and is able to identify the music being played without using any side information or watermarking technique, i.e., the signal being listened to was not preprocessed in any manner (for example, to insert inaudible identifying sequences, as in watermarking).

According to another aspect of the invention, the method comprises the acts of extracting a fingerprint from the first few seconds of audio, and then comparing this fingerprint to those stored in a large database of songs. Because it is desired to identify songs taken among a very large set (several hundreds of thousands), the fingerprint matching process is extremely simple, since it requires comparing the fingerprint to several hundreds of thousands, and yields a reliable result in a small amount of time (less than a second, for example).

According to another aspect of the invention, the identification process is fairly robust to alterations that might be present in the signal, such as audio coding/decoding artifacts, distortion, spectral coloration, reverberation and so on. These alterations might be undesirable, for example resulting from defects in the coding or transmission process, or might have been added on purpose (for example, reverberation or dynamic range compression). In either case, these alterations do not prevent the identification of the musical piece.

According to another aspect of the invention, subband energy signals, having a magnitude in dB, are extracted from overlapping frames of the signal. A difference signal is then generated for each subband. The frequency components of the difference signals from the difference signals of the subbands is used as a fingerprint.

According to another aspect of the invention, the subband energy signals are smoothed so the fingerprint will be still be useful to identify a signal that has been subsequently altered. For example, the signal may have had reverb effects added.

According to another aspect of the invention, the fingerprint is compared to a fingerprint database to identify the audio signal.

According to another aspect of the invention, local maxima of selected parameter of the audio signal are located and a fingerprint monitoring period is located near a local maxima.

Other features and advantages of the invention will be apparent from the following detailed description and appended drawings.

DESCRIPTION OF THE SPECIFIC EMBODIMENTS

Overview

The general idea of the technique presented embodied by the present invention includes the acts of analyzing the audio signal by use of a Short-Term Fourier Transform, then forming a number of derived signals that represent the energy in dB in N selected frequency bands. These energy signals are recorded for, say, the first 10 seconds of the audio signal, yielding N energy signals of M points each. Each of these N signals are then differentiated with respect to time, and the resulting signals undergo a Fourier Transform, yielding N frequency-domain energy signals of $M_F$ points each. The magnitude of the first few values of these frequency-domain signals are then extracted and concatenated to form the fingerprint.

This fingerprint is then compared to fingerprints in a database, simply by calculating the Euclidean norm between the fingerprint and the database candidates. The database candidate which yields the smallest norm indicates the identified musical piece.

Figure 1:
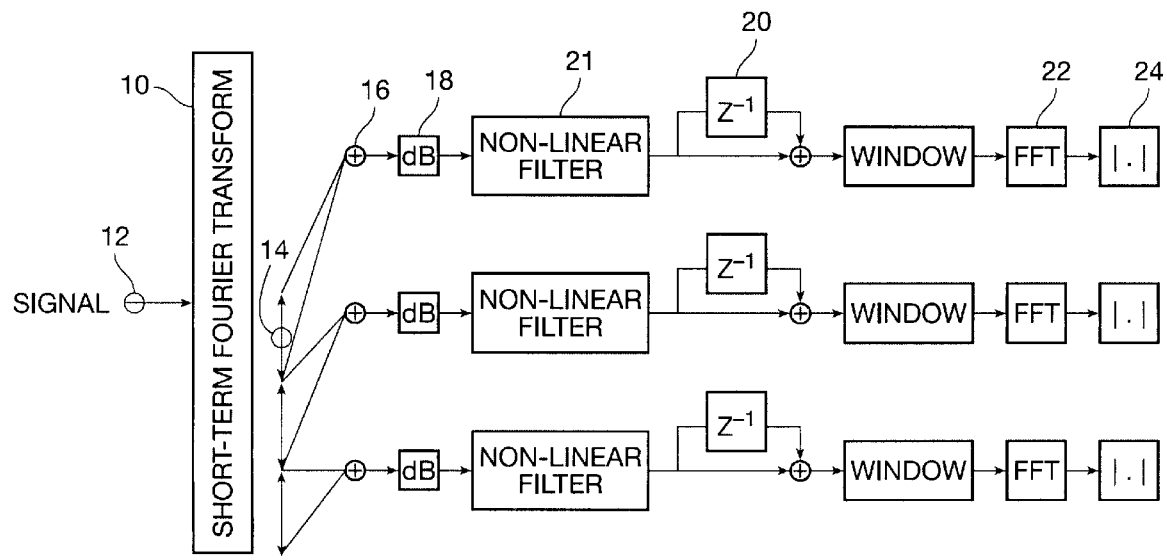
FIG. 1 is flowchart of the fingerprint extraction algorithm.

As depicted in FIG. 1, a short-term Fourier transform 10 is calculated on the incoming signal 12. The magnitudes of the FFT bins 14 are summed 16 within predefined frequency bands, and the results, expressed in dB 18, are processed by a first-order difference filter 20 (and, optionally, by a non-linear smoothing filter 21). A second FFT 22 is calculated on the first order difference signal and magnitudes 24 are utilized as the fingerprint. Each of these steps are described in detail below.

Extracting the Time-domain Subband Energy Signals

The incoming signal is first analyzed by use of an overlapping short-term Fourier transform: once every 256 samples, a 1024 sample frame of the signal is extracted and multiplied by a weighting window, and then processed by a Fourier transform. For each frame, the magnitudes of the FFT bins in N selected frequency bands are summed, and the N results are expressed in dB. As a result, there are now N energy values for each signal frame (i.e., every 256 samples), or in other words, N subband energy signals expressed in dB.

In some cases, for example when desiring to develop a fingerprint that identifies a signal having reverb added, the subband energy signals can be further smoothed, for example by use of a non-linear exponential-memory filter 21. Denoting E(f, n) the energy in subband f at frame n, filtered signals Ê(f, n) are defined by $$\hat{E}(f, n) = \begin{cases} E(f, n) & \text{if } E(f, n) > \hat{E}(f, n-1) \\ \alpha E(f, n) + (1-\alpha)\hat{E}(f, n-1) & \text{if } E(f, n) \leq \hat{E}(f, n-1) \end{cases}$$

where $\alpha$ is a smoothing parameter with a small value. This ensures that Ê(f, n) closely follows E(f, n) during increasing segments, but is smoothed out when E(f, n) decreases. When reverberation is added to a signal energy levels tend to be sustained. Reverbs usually have a short attack time and a long sustain so that smoothing is only done on decay (E(f, n) decreasing) but not on atack. Thus, by smoothing only decreasing subband components a more robust fingerprint is obtained that will identify signals having reverb added. For example, if the audio signal being identified has not been altered then its fingerprint will exactly match the fingerprint stored in the database. On the other hand, if the audio signal being identified has reverb added then the smoothing filter will not change the energy curve significantly because the energy of the signal has already been "smoothed" by the added reverb. Thus, the fingerprint derived from the aduio signal being analysed will closely match the stored fingerprint.

In practice, frequency bands should be chosen that span a useful portion of the frequency range, but prove to be the least affected by artifacts and signal alterations. For example, 4 bands between 100 Hz and 2 kHz could be chosen.

The step of calculating the subband energy signals can also be done entirely in the time-domain, by using bandpass filters tuned to the desired band, downsampling the output and calculating its power.

Calculating the Fourier Transform of the Energy Signals

At the end of the "monitoring period", for example 10 seconds after the start of the audio signal, the N subband energy signals are processed by a first-order difference, yielding subband "energy flux" signals.

$\hat{d}_E(f, n) = \hat{E}(f, n) - \hat{E}(f, n-1)$

Because Ê(f, n) is expressed in dB, this has the desirable effect of discarding any constant-amplitude factor in the subband energy. In other word, two signals that only differ by their amplitude will yield the same signals $\hat{d}_E(f, n)$. Similarly, two signals that only differ by a constant or slowly time-varying transfer function (the second being obtained by filtering the first by a constant or slowly time-varying filter) will yield very similar $\hat{d}_E(f, n)$, which is very desirable.

A window is then applied to each subband energy flux signal, and the Fourier transform of the result is taken, yielding N frequency-domain signals $\hat{D}_E(f, F)$ (where f is the subband, and F is the frequency). Taking the magnitude of the result ensures that the frequency-domain signals are somewhat robust to time-delay. In other words, two signals that only differ by a relatively small delay (compared to the duration of the "monitoring period") will yield very similar signals $|\hat{D}_E(f, F)|$, which is highly desirable, since in practical applications, there might not be a reliable reference for time-aligning the signal.

Forming the Fingerprint

The fingerprint is obtained by selecting the first few values of the magnitude-only frequency-domain energy-flux signals $|\hat{D}_E(f, F)|$, for k values of F close to 0 Hz.(for example, up to 6 or 7 Hz), in each subband f. A window can be applied to the values so the magnitude decreases for increasing frequencies. This ensures that more attention is paid to low-frequencies (which describe the slow variations of the energy flux signal) than to high-frequencies (which describe the finer details of the energy flux signal).

Concatenating the k values extracted from each of the N bands produces the audio fingerprint. The fingerprint can additionally be quantized and represented using a small number of bits (for example as an 8-bit word).

Matching the Fingerprint

The fingerprint can then be compared to a database of fingerprints extracted from known material. A simple Euclidean distance is calculated between the fingerprint and the candidate fingerprints in the database. The candidate fingerprint that corresponds to the smallest Euclidean distance indicates which material was played. The value of the Euclidean distance also indicates whether there is a good match between the fingerprint and the candidate (good recognition certainty) or whether the match is only approximate.

The Problem of Time-alignment

The technique described above is somewhat immune to mismatches in time-alignment, but not entirely. If the segment of the audio being analyzed does not correspond exactly to the same segment in the database, the monitored fingerprint will be slightly different from the fingerprint in the database, all the more different as the two segments are further apart in time. In some cases, it is reasonable to expect that the monitoring device will have some notion of where the beginning of the song is, in which case the analyzed segment will correspond fairly well to the segment in the database. In some other situations (for example, when monitoring a stream of audio without clear breaks), the monitoring device will have no notion of where the beginning of the track is, and the fingerprint matching will fail.

One way around that problem consists of monitoring the overall energy of the signal (or some simple time-varying feature of the signal), identifying local maxima and setting the time at the local maximum as the beginning of the monitoring period (the period over which the fingerprint will be determined). For signals in the database, the monitoring period could be located at one of the local maxima of the energy and the fingerprint determined from that monitoring period. For the signal to be identified by the device, the device could locate local maxima and check the corresponding fingerprints with the database. Eventually, one of the local maxima will fall very near the local maximum which was used in the database and will yield a very good fingerprint match, while the other fingerprints taken at other local maxima will not fit well.

Figure 2:
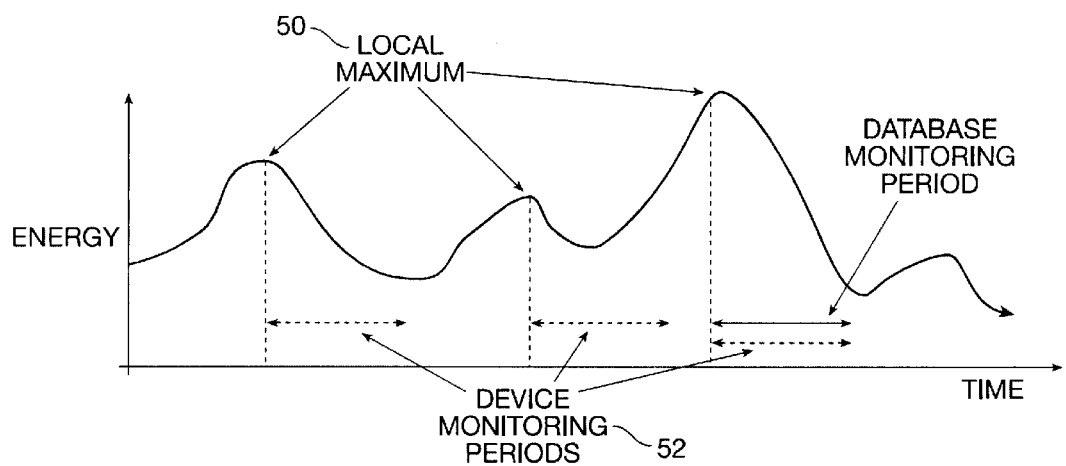
FIG. 2 is a graph depicting local maxima of an audio signal's time varying energy.

Identification when no time-reference is available is described in FIG. 2. The signal's time-varying energy is calculated and local maxima 50 are determined. For the database fingerprints, the monitoring period 52 is located relative to one of the local maxima. The monitoring device calculates fingerprints around local maxima of the energy and matches them with the database. A good match is only obtained when the local maximum is the one that was used for the database. This good match is used to determine which song is being played. By detecting that a good match was obtained (for example, because the Euclidean distance between the fingerprint and the best database candidate is below a threshold), the device will be able to reliably identify the music piece being played. The choice of the local maximum used in the database can be arbitrary. One might want to pick one that is close to the beginning of the song, which would make the identification faster (since the monitoring device will reach that local maximum faster).

In a preferred embodiment the invention is implemented in software, stored on a computer-readable storage structure, executed by a computing system which may include a digital signal processor (DSP).

The invention has now been described with reference to the preferred embodiments. Alternatives and substitutions will now be apparent to persons of ordinary skill in the art. For example, different smoothing algorithms to add robustness for different effects are known in the art. In addition specific frequencies or ranges are denoted for purposes of illustration not limitation. Accordingly, it is not intended to limit the invention except as provided by the appended claims.

What is claimed is:

1. A method of identifying a digital audio signal by monitoring the content of the audio signal, said method comprising the acts of:

selecting a set of frequency subbands of said audio signal, with each frequency having a selected frequency range;

for each subband, generating subband energy signal having a magnitude, in decibels (dB), equal to signal energy in the subband;

forming an energy flux signal for each subband having a magnitude equal to the difference between subband energy signals of neighboring frames;

determining the magnitude of frequency components bins of the energy flux signal for each subband;

forming a fingerprint comprising the magnitudes of the frequency component bins of the energy flux signal for all subbands; and comparing the fingerprint for the audio file to fingerprints in a database to identify the audio file.

2. The method of claim 1 where said step of generating a subband energy signal comprises the acts of:

for each subband, filtering the audio signal to obtain a filtered signal having only frequency components in the subband; and calculating the power of the filtered signal.

3. A method of generating a fingerprint for identifying an audio signal, said method comprising the acts of:

selecting a set of frequency subbands of said audio signal, with each frequency having a selected frequency range;

for each subband, generating subband energy signal having a magnitude, in decibels (dB), equal to signal energy in the subband;

forming an energy flux signal for each subband having a magnitude equal to the difference between subband energy signals of neighboring frames;

determining the magnitude of frequency components bins of the energy flux signal for each subband; and forming a fingerprint comprising the magnitudes of the frequency component bins of the energy flux signal for all subbands.

4. The method of claim 3 where said step of generating a subband energy signal comprises the acts of:

dividing a segment of the signal into overlapping frames;

for each frame, determining the magnitude of frequency bins at different frequencies;

selecting a set of frequency subbands of a desired frequency range;

for each subband and each frame, summing the frequency bins of the frame located within the subband to form a subband energy signal having a magnitude expressed in decibels (dB) for the given frame.

5. The method of claim 3 where said step of generating a subband energy signal comprises the acts of:

for each subband, filtering the audio signal to obtain a filtered signal having only frequency components in the subband; and calculating the power of the filtered signal.

6. A method of identifying a digital audio signal by monitoring the content of the audio signal, said method comprising the acts of:

dividing a segment of the signal into overlapping frames;

for each frame, determining the magnitude of frequency bins at different of frequencies;

selecting a set of frequency subbands of a desired frequency range;

for each subband and each frame, summing the frequency bins of the frame located within the subband to form a subband energy signal having a magnitude expressed in decibels (dB) for the given frame;

forming an energy flux signal for each subband having a magnitude equal to the difference between subband energy signals of neighboring frames;

determining the magnitude of frequency components bins of the energy flux signal for each subband;

forming a fingerprint comprising the magnitudes of the frequency component bins of the energy flux signal for all subbands;

comparing the fingerprint for the audio file to fingerprints in a database to identify the audio file.

7. The method of claim 6 further comprising the acts of:

smoothing the subband energy signal for each subband to compensate for subsequent alterations of the audio signal.

8. The method of claim 6 further comprising the acts of:

generating local maxima of a parameter of the audio signal; and locating a fingerprint monitoring period near a local maxima.

9. The method of claim 8 where said act of generating comprises:

generating local maxima of the energy content of the audio signal.

10. A computer program product comprising:

a computer readable storage medium having computer program code embodied therein for forming a fingerprint for identifying an audio file, said computer program code comprising:

program code for causing a computing system to select a set of frequency subbands of said audio signal, with each frequency having a selected frequency range;

for each subband, program code for causing a computing system to generate subband energy signal having a magnitude, in decibels (dB), equal to signal energy in the subband;

program code for causing a computing system to form an energy flux signal for each subband having a magnitude equal to the difference between subband energy signals of adjacent frames;

program code for causing a computing system to determine the magnitude of frequency components bins of the energy flux signal for each subband; and program code for causing a computing system to form a fingerprint comprising the magnitudes of the frequency component bins of the energy flux signal for all subbands.

* * * * *